United States Patent
Suzue et al.

(10) Patent No.: US 6,301,821 B1
(45) Date of Patent: Oct. 16, 2001

(54) TUBULAR SUBSTANCE AND MANUFACTURING METHOD THEREFOR

(75) Inventors: Hiroyasu Suzue, Saitama; Kenichi Kameda; Hideyuki Naitou, both of Tokyo; Tomoyoshi Tsurufuji, Saitama; Nobuaki Takamatsu, Tokyo, all of (JP)

(73) Assignee: Daiwa Seiko, Inc. (JP)

( * ) Notice: Subject to any disclaimer, the term of this patent is extended or adjusted under 35 U.S.C. 154(b) by 788 days.

(21) Appl. No.: 08/568,337

(22) Filed: Dec. 6, 1995

(30) Foreign Application Priority Data

| Dec. 6, 1994 | (JP) | 9-330141 |
| Mar. 27, 1995 | (JP) | 9-093021 |
| Mar. 27, 1995 | (JP) | 7-093022 |
| Jun. 30, 1995 | (JP) | 7-166548 |

(51) Int. Cl.$^7$ ........................... A01K 87/00
(52) U.S. Cl. ..................... 43/18.1; 43/18.5
(58) Field of Search ............. 43/18.1, 18.5

(56) References Cited

U.S. PATENT DOCUMENTS

| 3,953,637 | * | 4/1976 | Phillips | 43/18.1 |
| 4,061,806 | * | 12/1977 | Lindler | 43/18.1 |
| 4,582,758 | * | 4/1986 | Bruce | 43/18.1 |
| 5,076,004 | * | 12/1991 | Sunaga | 43/18.5 |

FOREIGN PATENT DOCUMENTS

| 0062973 | 10/1992 | (EP) . |
| 2281491 | 3/1995 | (GB) . |
| 2-16628 | 5/1990 | (JP) . |
| 2-44492 | 10/1990 | (JP) . |
| 4248944 | 9/1992 | (JP) . |
| 6-7923 | 2/1994 | (JP) . |

* cited by examiner

Primary Examiner—Kurt Rowan
(74) Attorney, Agent, or Firm—Liniak, Berenato, Longacre & White (57) ABSTRACT

The invention concerns a durable and good-operability fishing rod which is highly strong and is improved in specific rigidity by preventing excessive resin, reinforced fibers from leaning to one side, and resin pools. The fishing rod has a main layer (12) formed by winding a first prepreg provided by impregnating highly strong fibers with resin so that weight percentage becomes 25% or less so that the fibers are oriented in an axial length direction and a reinforcement layer (14, 16) formed by winding a second prepreg provided by impregnating highly strong fibers with resin so that the fibers are oriented in a direction crossing the fiber orientation of the main layer (12) on at least one side of the inside and outside of the main layer (12). The reinforcement layer (14, 16) is formed thinner than the main layer (12), and resin impregnation percentage of the second prepreg is set to substantially the same as that of the first prepreg.

20 Claims, 6 Drawing Sheets

TUBULAR SUBSTANCE AND MANUFACTURING METHOD THEREFOR

BACKGROUND OF THE INVENTION

This invention relates to a tubular substance made by winding prepreg provided by impregnating reinforcing fibers aligned or oriented mainly in one direction with thermosetting resin and pressurizing and heating it, and a manufacturing method therefor. Therefore, it can be used for rod pipes of fishing rods, shafts of golf clubs, etc.

Fishing rods need to be lightweight because they are held for long hours and from the viewpoint of improvement in operability and further need to be improved in strength because they receive a large bend force of strong pulling of fish, etc. Golf clubs also need to have light and highly strong nature. Thus, fishing rods and shafts of golf clubs need to satisfy compatibility of antithetic properties of lightweight and high strength. Therefore, hitherto, lightweight and strong tubular substances have been made by impregnating highly strong and lightweight fibers such as carbon fibers with synthetic resin such as epoxy resin for forming prepreg and winding, pressurizing, and heating the prepreg.

In this case, the fact that the weight percentage of resin in the prepreg generally is 35% to 40% is disclosed in Japanese Patent Publication No.Hei 2-44492. The Publication specifies the relationship between the resin impregnation amount of the first prepreg of the innermost layer of a rod pipe and that of the second prepreg for the main layer of an outer layer from the viewpoints of conformability with the mandrel and coherency of the layers, wherein the fact that the resin impregnation amount of the prepreg of the innermost layer is 50% or less and that of the outer layer is 30% or less is disclosed.

However, the weight increases because the resin amount is large as a whole. Further, because the above-disclosed resin amount is too much with respect to fibers, the formation of a resin layer or resin pool (portion with no or few fibers) where delamination or crack easily occurs is observed from photomicrographs. A resin flow occurs during molding, and thus fibers also move easily in association with the resin flow to meander or lean to one side, whereby lowering of strength or unintentional bending easily occurs.

Particularly, if the resin amount of the prepreg for the main layer exceeds about 25 wt %, when the prepreg is wound and thereafter tightened with tape and heat-molded, circumferential shift of the prepreg material occurs during the molding depending on the tightening condition and molding failure often occurs. However, if prepreg impregnated evenly with a small amount of resin is used, coherency on boundaries of wound layers worsens and voids occur on the boundaries. Particularly on the prepreg-wound layer boundaries of fibers oriented in the length direction of the mandrel, the voids easily occur continuously in the length direction, causing the strength to lower due to delamination.

Japanese Utility Model Laid-Open Publication No.Hei 6-7923 discloses the fact that heating and molding in a state in which a resin flow from an inner layer to surface layer is suppressed is a point to be considered. On the other hand, this publication also discloses the fact that an inner reinforcement layer contains a larger resin impregnation amount than the main layer for conformity with a mandrel and that an outer reinforcement layer contains a larger resin impregnation amount than the main layer for discharging air pools.

However, if the resin percentages of the reinforcement layers are set larger than that of the main layer for conformity with the mandrel and for pushing out air pools of the outer reinforcement layer, the resin flow from the inner layer to the outer layer is not completely suppressed. Therefore, it is desired that the layers have the same resin percentage.

The conformity with the mandrel may be achieved, for example, by adjusting the molding temperature and pressurization force instead of setting the large amount of resin. Air pools can be pushed out by another method instead of setting the large amount of resin for preventing air pools from being produced at prepreg molding. However, the lightweight of the molded rod pipe and improvement in the specific rigidity can be accomplished only by adjusting the resin amount.

SUMMARY OF THE INVENTION

It is therefore an object of the invention to provide a tubular substance which is highly strong and has excellent durability without impairing the lightweight and a manufacturing method therefor.

According to one aspect of the invention, under concepts of achieving the lightweight and preventing resin from flowing, there is provided a fishing rod comprising a main layer formed by winding a first prepreg provided by impregnating highly strong fibers with resin so that weight percentage becomes 25% or less so that the fibers are oriented in an axial length direction and a reinforcement layer formed by winding a second prepreg provided by impregnating highly strong fibers with resin so that the fibers are oriented in a direction crossing the fiber orientation of the main layer on at least one side of the inside and outside of the main layer, wherein the reinforcement layer is formed thinner than the main layer, and that resin impregnation percentage of the second prepreg is set to substantially the same as that of the first prepreg.

The resin impregnation percentage of each prepreg of which the main layer and the reinforcement layer are formed is set to substantially the same value and the resin percentage is made small to 25% or less, preventing resin from flowing, thereby preventing leaning of fibers, resin pools, and resin pool layers, the strength being improved. Since the entire resin percentage is small, the lightweight of the fishing rod is achieved and specific rigidity is improved. The reinforcement layer, which does not contribute to flexible rigidity of the fishing rod unlike the main layer with fibers oriented in the axial length direction, is formed thinner than the main layer for furthermore achieving the lightweight.

Substantially the same resin impregnation percentage refers to increase or decrease within the range of about 5%, preferably within the range of about 3%.

According to another aspect of the invention, there is provided a method of manufacturing a tubular substance comprising the steps of preparing a prepreg by impregnating carbon fibers with thermosetting synthetic resin so as to have a poor resin amount area and a rich resin amount area in a thickness direction and to contain an average impregnation amount of the thermosetting synthetic resin approximately in the range of 10 wt % to 20 wt %, winding the prepreg with the carbon fibers mainly oriented substantially in a length direction of a mandrel in plural turns so that a rich resin amount area is located in at least one of adjacent layers at a wound boundary, to thereby form a relatively thick layer corresponding to a main layer, winding a prepreg provided by impregnating reinforced fibers with thermosetting synthetic resin prior to, simultaneously with and/or subsequently to the above winding step so that its main fiber orientation crosses the carbon fibers oriented substantially in the length direction for forming at least one relatively thin layer corresponding to a reinforcement layer, pressurizing the layers corresponding to the reinforcement layer and main layer by a tightening substance from the outside and heating them, and removing the mandrel and the tightening substance.

The "wt %" refers to weight percentage to the total weight of the fibers and resin. The layer corresponding to the reinforcement layer may be placed within the layer corresponding to the main layer as well as on the inside or outside of the layer corresponding to the main layer. That is, for example, a manufacturing method of a tubular substance having the main layer with alternate disposition of a fiber layer in the substantial length direction and a thin layer (backing layer) having fibers in the substantially circumferential direction is also contained.

Although the prepreg contains a poor resin amount area and a rich resin amount area in the thickness direction, the average amount of resin is in the range of 10 wt % to 20 wt %. Since the layers corresponding to the reinforcement layers are thin, the absolute amount of resin is small, and prepreg material shear is hard to occur.

Since at least one layer has a rich resin amount area located at the wound layer boundary, the wound layer boundary coherency becomes good and voids are prevented from occurring on the boundaries. Since the absolute amount of resin is small, resin pools are also prevented from occurring. Therefore, the lightweight, highly elastic, and highly strong tubular substance can be formed owing to the small resin amount. Particularly, specific strength (strength per unit weight) is improved.

According to another aspect of the invention, there is provided a tubular substance comprising a main layer formed by winding a sheet-like prepreg and pressurizing and heating it, the main layer being reinforced with carbon fibers aligned so as to be oriented substantially in a length direction as a main unit with thermosetting synthetic resin as a matrix, an average amount of the synthetic resin ranging approximately from 10 wt % to 20 wt %, wherein a portion near a polymerized end position of the sheet-like prepreg, from which a resin pool is excluded, is formed so as to be a mixture of the carbon fibers and the thermosetting synthetic resin.

For the tubular substance formed by winding a sheet-like prepreg, a resin pool easily occurs in the vicinity of the polymerization end of the sheet-like prepreg. If the tubular substance is largely bent or compressed and deformed, generally a crack occurs from the resin pool of the polymerization end. However, since the synthetic resin amount of the main layer is approximately in the range of 10 wt % to 20 wt %, excessive synthetic resin does not exist, preventing a resin pool from occurring, inhibiting crack occurrence, improving strength, and achieving the lightweight.

According to another aspect of the invention, there is provided a tubular substance wherein in each layer formed by winding a prepreg provided by impregnating carbon fibers with thermosetting synthetic resin and heating and hardening it, a layer containing uneven distribution of percentage of the thermosetting synthetic resin in a thickness direction in the layer forms a main unit.

If thermosetting synthetic resin percentage is unevenly distributed in the thickness direction in the layer, a relatively large amount of synthetic resin can be distributed to necessary portions of each layer and a small amount of synthetic resin can be distributed to unnecessary portions. As compared with the state in which resin is evenly distributed, the total synthetic resin amount of the tubular substance can be lessened, enabling the tubular substance to be lightweight and highly strong.

According to one aspect of the invention, there is provided a tubular substance made by winding prepregs provided by impregnating highly strong fibers with synthetic resin to have a main layer with highly strong fibers mainly oriented substantially in a length direction and a reinforcement layer with highly strong fibers mainly oriented substantially in a circumferential direction, the reinforcement layer being thinner than the main layer and formed on an inner peripheral surface of the main layer, wherein an extra-thin coat consisting essentially of thermosetting or thermoplastic synthetic resin is heated and molded integrally with the reinforcement layer formed of the prepreg on an inner side of an innermost surface of the reinforcement layer.

Since an extra-thin coat is molded integrally on the inner side of the innermost surface of the thin reinforcement layer with highly strong fibers mainly oriented substantially in the circumferential direction, the highly strong fibers of the reinforcement layer can be prevented from coming in direct contact with the mandrel. Although the mandrel is drawn out in a direction traversing the highly strong fibers oriented in the circumferential direction of the reinforcement layer, the highly strong fibers are not scratched or cut in the direction traversing the highly strong fibers because of the presence of the coat. Thus, the reinforcement function of the thin reinforcement layer is prevented from reducing and a highly strong tubular substance is provided. If it is used for a long term, scratches of the highly strong fibers are not enlarged, providing excellent durability. Since the coat exists inside the tubular substance, if a foreign member such as a fishing line, a small-diameter tube, or parts strikes the inside, the highly strong fibers can be protected by the coat, thus providing durability. Further, since the coat is extremely thin, the lightweight is not impaired.

According to another aspect of the invention, there is provided a method of manufacturing a tubular substance comprising the steps of applying a releasing agent to a mandrel, putting a coat of material consisting essentially of thermosetting synthetic resin on the releasing agent for forming a hardened or semi-hardened extra-thin coat, winding prepreg provided by impregnating highly strong fibers with synthetic resin around an outside of the coat, preparing a pressurizing member, pressurizing from an outside of the prepreg with the pressurizing member and heating and hardening, and removing the pressurizing member and drawing out the mandrel.

According to the manufacturing method of the invention, the hardened or semi-hardened coat, which is previously formed, exists between the wound prepreg and the mandrel. If the mandrel is drawn out after heating and molding, the coat prevents the highly strong fibers of the prepreg from being damaged owing to minute asperities on the mandrel surface. The lightweight, highly strong, and durable tubular substance can be easily manufactured.

The present inventor also focused attention on portions where strength is reduced when the resin impregnation amount of fiber reinforced prepreg is lessened and have found that a fishing rod having excellent specific strength and specific elasticity can be provided by reinforcing the portions for our invention.

According to another aspect of the invention, there is provided a fishing rod made of a rod pipe comprising a plurality of layers formed by winding fiber reinforced prepreg provided by impregnating reinforced fibers aligned in a specific direction with resin so that the reinforced fibers are oriented in an axial length direction, wherein an inner layer of the layers has bubbles and wherein bubbles existing in an outermost layer and/or layer interface are fewer than the bubbles existing in the inner layer.

In the invention, preferably an end of the fiber reinforced prepreg on the outermost layer of the rod pipe is formed with a thickness adjustment part for absorbing the level difference caused by the thickness difference. Preferably, an end of the fiber reinforced prepreg on an intermediate layer of the rod pipe is formed with a thickness adjustment part for absorbing a level difference caused by a thickness difference. Preferably, fiber reinforced prepreg provided by impregnating reinforced fibers aligned, and oriented in a direction different from the axial length direction with resin is made to intervene between the layers.

In the invention, the bubbles existing in the outermost layer and/or layer interface are set fewer than those existing in the inner layer; at least they need to be fewer than the bubbles existing in the inner layer and preferably fewer bubbles exist in the outermost layer and/or layer interface. The inner layer means a layer wound inside the outermost layer.

In the invention, preferably the weight percentage of the resin to the total weight of the reinforced fibers and the resin is as small as possible, for example, about 20 wt % or less to improve the specific strength and specific elasticity of the fishing rod as much as possible.

In the invention, if the thickness adjustment part is provided, bubbles need not exist in a plurality of layers or layer interface.

The fishing rod of the invention is made of a rod pipe comprising a plurality of layers formed by winding fiber reinforced prepreg provided by impregnating reinforced fibers with resin. The inner layer of the layers has bubbles and the bubbles existing in the outermost layer and/or layer interface are fewer than the bubbles existing in the inner layer.

In the fishing rod having the structure, the portion where strength reduction is comparatively hard to occur, namely, the inner layer of the layers contains bubbles and bubbles scarcely exist in portions where bending stress largest acts and the strength comparatively easily reduces, namely, the outermost layer and the layer interface.

Therefore, while the strength can be prevented from reducing on the outermost layer and layer interface and damage to the portions is prevented, the resin impregnation amount is decreased in the inner layer, thereby providing a lightweight and highly strong fishing rod.

The end of the fiber reinforced prepreg on the outermost layer of the rod pipe is formed with a thickness adjustment part for absorbing the level difference caused by the thickness difference, whereby stress concentrating on the level difference is spread if a large load is applied, thus delamination, a crack, or the like can be prevented from occurring on the end.

The end of the fiber reinforced prepreg on the intermediate layer of the rod pipe is formed with a thickness adjustment part for absorbing the level difference caused by the thickness difference, whereby the reinforced fibers can be prevented from being abutted directly against the end and broken with the end as a supporting point.

The fiber reinforced prepreg provided by impregnating reinforced fibers pulled, aligned, and oriented in a direction different from the axial length direction with resin is made to intervene between the layers, whereby crush or buckling can be prevented and in the bubble existing portions, delamination of the reinforced fibers can be prevented.

DETAILED DESCRIPTION OF THE PREFERRED EMBODIMENTS

Referring now to the accompanying drawings, there are shown preferred embodiments of the invention.

Figure 1:
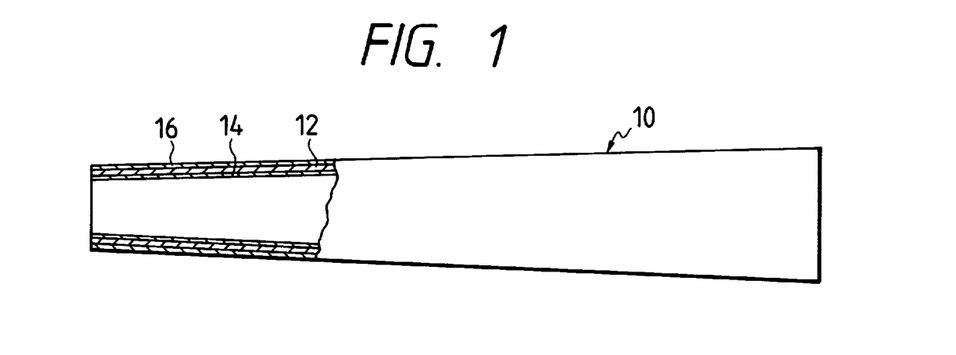
FIG. 1 is a partially broken-away side view of a fishing rod according to the invention.
Figure 2:
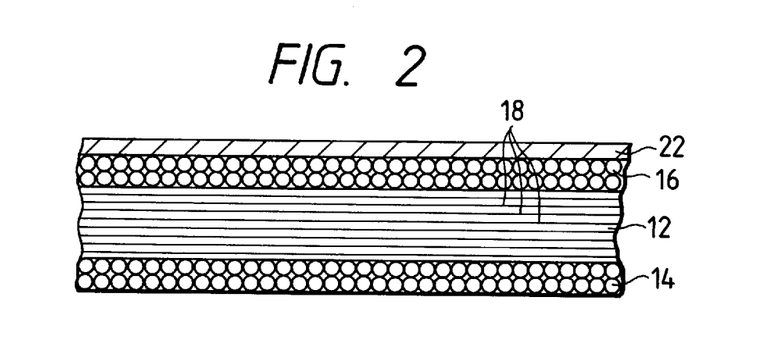
FIG. 2 is a partially enlarged view of FIG. 1.

FIG. 1 is a fragmentary sectional view of a fishing rod pipe 10 according to the invention. The rod pipe 10 may be a shaft of a golf club, a ski stock, a bicycle frame, or the like. In FIG. 2, the rod pipe 10 has a main layer 12 made by winding prepreg provided by impregnating a bundle of carbon fibers 18 pulled and aligned in one direction with epoxy resin so that the carbon fibers 18 are oriented in the length direction of the rod pipe 10, and heating and hardening the prepreg. The carbon fibers 18 are one example of highly strong fibers and may be glass fibers, boron fibers, etc., and the epoxy resin is one example of thermosetting resin and may be polyester resin, phenol resin, etc., throughout the specification.

Reinforcement layers 14 and 16 thinner than the main layer 12 are formed on the inside and outside of the main layer 12 respectively. For the reinforcement layers 14 and 16, prepreg provided by impregnating a bundle of carbon fibers pulled and aligned in one direction with epoxy resin is wound so that the fibers are oriented in the circumferential direction of the rod pipe 10, and is heated together with the main layer 12 for hardening, thereby forming the rod pipe 10. The reinforcement layers are provided for preventing a crush or destruction which would occur if the main layer 12 only existed; the reinforcement layer may be formed only on either the inside or the outside. Preferably, the reinforced fibers are the same as the reinforced fibers 18 of the main layer 12, but can also be made different from them. Generally, the reinforced fibers are oriented in the circumferential direction, but may be oriented in a slant direction between the length direction and the circumferential direction. Numeral 22 is a protective layer of epoxy resin, etc.

Considerations of a manufacturing method of the layers 12, 14, and 16 will be discussed later. The weight percentage of the resin of the prepreg of which the main layer 12 is formed is 25% or less and the weight percentage of each resin impregnation amount at the prepreg stage of each reinforcement layer 14, 16 is also 25% or less. Moreover, the main layer 12 and the reinforcement layers are set to substantially the same resin percentage in the prepreg; substantially the same resin percentage is set within the error range of about 5%, preferably within the range of about 3%.

From the viewpoint of bonding the fibers to each other, the lower limit of the weight percentage of the synthetic resin is about 10%, preferably about 15%. According to photomicrographs of the rod pipe 10 manufactured by setting the resin percentage of the prepreg of which each layer is formed as the embodiment to 20%, it is not found that fibers meander or lean to one side, and resin pools are not observed in each layer or layer interface. In contrast, if the resin percentage of the prepreg of which the main layer is formed is set to 25% and that of which each reinforcement layer is formed is set to 40%, fiber leaning to one side and resin pools are observed. This indicates that the fishing rod pipe according to the invention is strong.

Considerations on a rod pipe manufacturing method when the rod pipe 10 and the main layer 12 shown in FIG. 1 are formed as a multilayer will be discussed.

To mold prepreg of each layer, one end of the length direction of the carbon fibers pulled and aligned in one direction is impregnated with epoxy resin or one end of either the surface or rear of a fiber bundle sheet is impregnated so as not to produce air pools. In the former, bubbles are pushed out from the opposed end of the length direction of the fibers and are hard to remain as compared with the case where both ends of the fibers are impregnated. In the latter, bubbles are hard to remain as compared with the case where both ends are impregnated, as in the former, and the workability is also improved as compared with the former. In both the former and latter, since resin used for pushing out bubbles at heating and molding becomes unnecessary, the amount as much as the resin can be lessened.

Before the substance is laminated, heated, and hardened, the layers are brought into intimate contact with each other by sufficiently pressurizing, and bubbles are excluded from in the layer interfaces. Further, conformity with a mandrel can be improved by adjusting the heating and molding temperatures and increasing the pressurization force, as described above.

Without rapidly rising to a hardening temperature at heating, preferably heat is previously applied at a resin softening temperature lower than the hardening temperature and the whole is made to adapt itself with the temperature held from the viewpoint of preventing bubbles from occurring.

Further, since the substance contains a small resin percentage, preferably a pressurization force is made higher than that at conventional molding in large resin percentage for improving adhesion between fibers.

Although the main layer 12 is a single layer with fibers pulled and aligned in one direction in the embodiment, a layer pulled and aligned in the length direction of the rod pipe 10 and a thin layer pulled and aligned in a direction perpendicular or slant to that layer may be disposed and laminated alternately for forming the main layer 12. Also in this case, the weight percentage of resin of each prepreg of which the main layer 12 is formed is set to substantially the same value (in the embodiment, 20%) in the range of 25% or less. Preferably, the layers are made of the same type of reinforced fibers, but may be made of different types of reinforced fibers.

Since the main layer 12 of the rod pipe 10 of the embodiment in FIG. 1 according to the invention has not necessarily sufficient shock resistance strength, a thermoplastic resin layer having a good vibration absorption property may be formed on the outside of the reinforcement layer 16 of the outermost layer, namely, the lower part of the protective layer 22 or if the outer reinforcement layer 16 does not exist, may be formed directly on the outside of the main layer 12. As an example of the thermoplastic resin layer, if polyamide fibers or film is wound on the layer formed by winding prepreg described above and in this state, the above-mentioned heat process for hardening is executed, the polyamide fibers or film softens and is formed like a layer depending on the temperature. This softening may be incomplete.

As seen from the description made so far, according to the invention, the resin percentage is made small, thus the lightweight is achieved, specific rigidity is improved, and operability becomes good. Since the layers are set to substantially the same resin percentage in addition to the small resin percentage, resin does not flow, fibers do not meander or lean to one side, and resin pools do not occur. Therefore, a durable and good-operability fishing rod which is highly strong can be provided.

Figure 3:
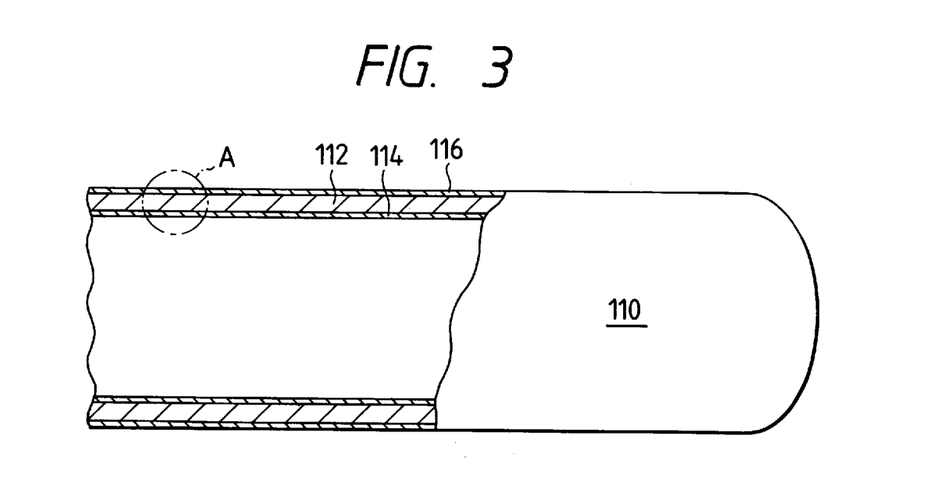
FIG. 3 is a fragmentary sectional view of a tubular substance according to the invention.

FIG. 3 is a fragmentary sectional view of a laminated tubular substance 110 according to the invention. The tubular substance 110 has a main layer 112 made by a proper number of times winding sheet-like prepreg provided by impregnating a bundle of carbon fibers pulled and aligned so as to be oriented in one direction with epoxy resin so that the carbon fibers are oriented in the substantial length direction of the tubular substance 110, and pressurizing and heating the prepreg. The epoxy resin is one example of thermosetting synthetic resin; it may be polyester resin, phenol resin, etc.

Reinforcement layers 114 and 116 thinner than the main layer 112 are formed on the inside and outside of the main layer 112 respectively. For the reinforcement layers 114 and 116, prepreg provided by impregnating a bundle of carbon fibers pulled and aligned so as to be oriented mainly in one direction with epoxy resin is wound so that the fibers are mainly oriented substantially in the circumferential direction of the tubular substance 110, and is pressurized and heated together with the main layer 112 for hardening, thereby forming the tubular substance 110.

Although the carbon fibers of the main layer 112 are oriented in the length direction of the tubular substance 110, a reinforcement layer consisting essentially of fibers oriented crossing the direction, for example, in the above-mentioned circumferential direction may be mixed between wound layers oriented in the length direction.

Figure 4A:
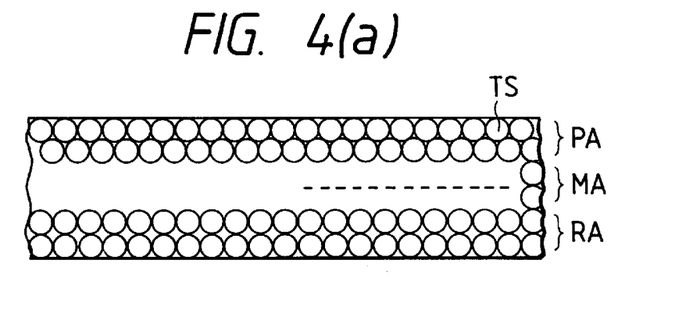
FIGS. 4(a) and 4(b) are sectional views of two types of prepregs forming a tubular substance.
Figure 4B:
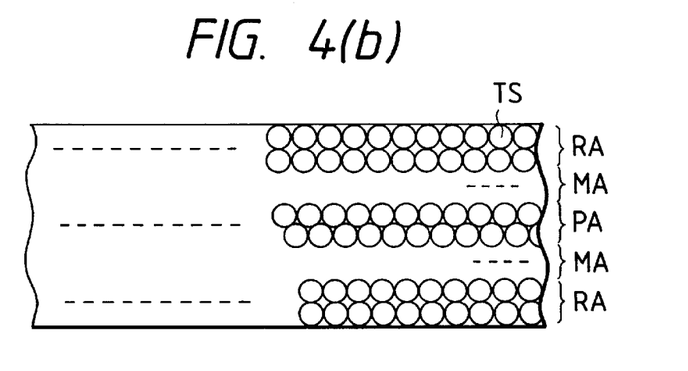

To form such sheet-like prepreg, for example, a thermosetting synthetic resin film is placed along one side of a bundle of carbon fibers TS pulled and aligned and they are processed or a thermosetting synthetic resin film is placed along both sides of the carbon fiber bundle and they are inserted between a pair of rollers for pressing. The prepreg formed by the former method becomes as shown FIG. 4(a) schematically showing the cross sections of prepreg; the prepreg formed by the latter method becomes as shown in FIG. 4(b). That is, in FIG. 4(a), a rich resin amount area RA containing a relatively large amount of epoxy resin as thermosetting synthetic resin capable of preventing voids from occurring if it is heated and hardened in the resin impregnation state exists on one side, a poor resin amount area PA containing a small amount of resin causing voids to occur if it is heated and hardened in the resin impregnation state exists on the opposed side, and a medium resin amount area MA exists between them. On the other hand, in FIG. 4(b), a rich resin amount area RA exists on both sides, a poor resin amount area PA exists in the center, and a middle resin amount area MA exists between the areas RA and PA.

As shown in the figures, the arrangement form of carbon fibers TS of the poor resin amount area PA is mainly a triangular layout and that of the rich resin amount area RA is mainly a quadrangular layout. If the cross section of each fiber is formed like a circle and the size is the same, the resin amount becomes the minimum in the triangular layout and the fibers can be impregnated with more resin in the quadrangular layout.

In the invention, the average synthetic resin impregnation amount of prepreg thus formed is in the range of 10 wt % to 20 wt %; it is fairly smaller than the conventional amount. This produces the effect of preventing a resin pool from occurring, etc., as described below.

Sheet-like prepreg is wound a proper number of times in such a direction that at least one layer of adjacent wound layers with a boundary between has a rich resin amount area RA faced to the boundary, and is pressurized and heated, then a layer to be made the main layer 112 after being pressurized and heated is formed. While being pressurized, it is heated and hardened together with layers corresponding to reinforcement layers 114 and 116 outside and inside the layer, thereby forming the tubular substance 110. The resin amount of the inner reinforcement layer 114 is set to a similar amount to that of the main layer 112. If the outer reinforcement layer 116 is pressurized with tightening tape, an air pool caused by tape polymerization remains between the tightening tape and the reinforcement layer 116. To discharge the air pool, the reinforcement layer 116 is impregnated with a larger amount of resin than the main layer 112.

The reinforcement layer may be placed only on either of the inside and the outside or be placed between wound layers in the main layer 112 depending on the necessity for reinforcement.

It is feared that the layer formed as described above to be made the main layer 112 may have a small amount of resin causing coherency failure of the boundary between the wound layers. However, in the invention, the resin amounts in each wound layer are uneven and at least one layer has a rich resin amount area RA faced to the boundary, thus providing coherency. The fact that some small voids remain in addition to a resin shift from rich area RA to poor area PA at pressurizing, heating, and molding is not a problem. The layer corresponding to the outer reinforcement layer 116 contains a considerably large amount of resin, but is thin and the absolute amount of resin is small. The resin is used to discharge an air pool caused by tightening tape and can little move to the inside of the layer corresponding to the main layer 112; it penetrates only the adjacent contact area. If the resin amount of the inner reinforcement layer 114 is increased, it is a thin layer and the absolute resin amount is small; the resin penetrates only the adjacent contact area. This is also applied when the reinforcement layer is disposed between the wound layers in the main layer. Thus, in the invention, the resin amount is proper, preventing fibers from shifting, meandering, or leaning to one side. Further, the lightweight is achieved, wound layer boundary coherency is improved, molding failure is hard to occur, and the specific strength of the tubular substance is improved.

Figure 5:
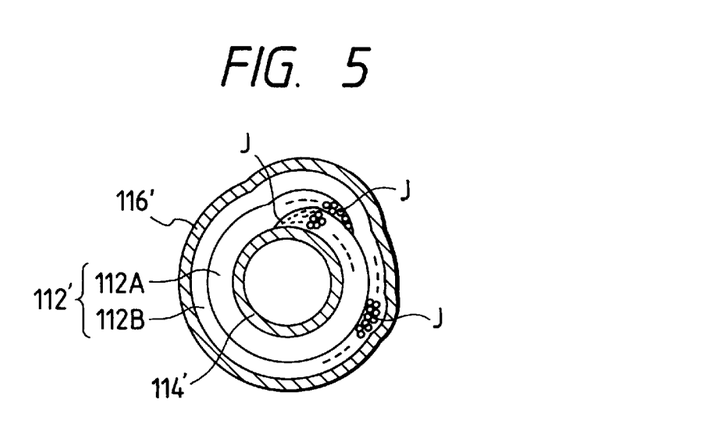
FIG. 5 is a schematic drawing of the transverse section of a conventional tubular substance.
Figure 6:
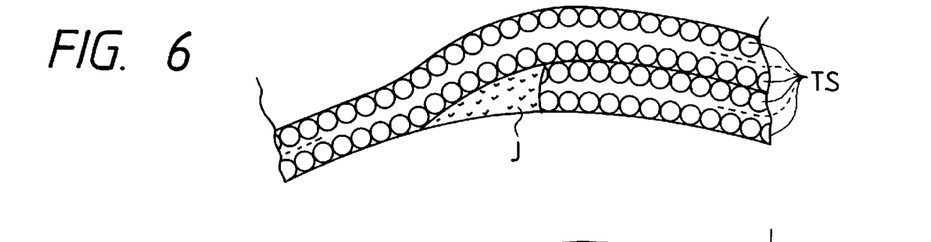
FIG. 6 is a polymerization end enlarged view corresponding to FIG. 5.

In addition, the invention also has the effect of preventing resin pool J discussed below from occurring: FIG. 5 is a schematic drawing of the cross section of a tubular substance made by winding prepreg having a conventional resin amount after the tubular substance is pressurized, heated, and hardened. It comprises an inner reinforcement layer 114', a main layer 112', and an outer reinforcement layer 116'. The main layer 112' has an inner layer 112A formed of a first sheet-like prepreg and an outer layer 112B formed of a second sheet-like prepreg. In such a case, the wind start end and termination end of each sheet-like prepreg are polymerized; in such polymerization end regions, hitherto, resin pool J has easily occurred and delamination has often occurred from here. FIG. 6 is an enlarged view of the polymerization end region, wherein resin pool J contains few fibers TS and thermosetting synthetic resin occupies most of the resin pool J.

Figure 7:
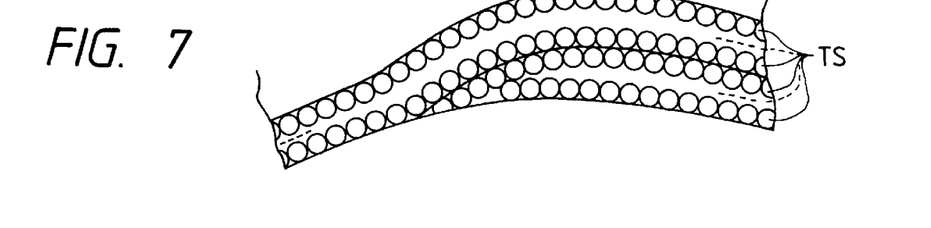
FIG. 7 is a polymerization end enlarged view of a main layer of the tubular substance according to the invention.

In comparison with FIG. 6, the polymerization end region of a main layer formed using a sheet-like prepreg having the resin amount according to the invention does not contain resin pool J and has carbon fibers TS dispersed properly as shown in FIG. 7. Thus, according to the invention, the resin pool is prevented from occurring and the strength of the tubular substance is improved.

If prepreg with uneven distribution of synthetic resin percentage in the thickness direction as shown in FIG. 4(a) or 4(b) is used to form a tubular substance by heating, although the percentage changes, the uneven distribution state of the synthetic resin percentage remains in the thickness direction in each wind formation layer provided by heating and hardening each wound layer.

Figure 8:
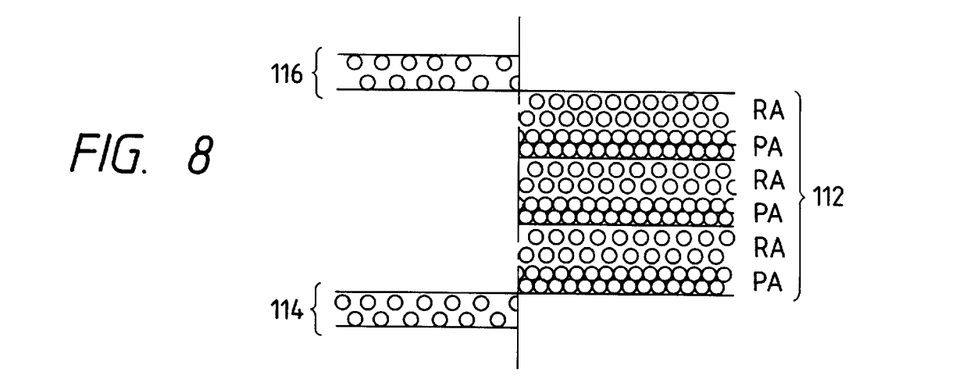
FIG. 8 is an enlarged view of an embodiment of part A in FIG. 3.

For example, as shown in FIG. 8, an enlarged view of part A in FIG. 3, if three layers each with uneven distribution of resin percentage in such a manner that one side of each of wind formation layers making up the main layer 112 is rich area RA and that the other side is poor area PA are aligned in orientation in the prepreg state and are overlapped so that the rich and poor areas are made adjacent to each other, coherency of each layer boundary is improved and the resin amount can be reduced as a whole as compared with the case of even resin percentage, achieving the lightweight. Therefore, the specific strength is also improved. The resin percentage in each of the inner and outer reinforcement layers 114 and 116 of the embodiment is substantially even and is set to the same resin percentage as the rich area RA of the main layer 112 or more. The boundaries with the main layer 112 are prevented from being lacking in resin, and provide a good contact formation property. The reinforcement layers are thin and the absolute amount of resin is small; the entire tubular substance is not contrary to the lightweight.

Figure 9:
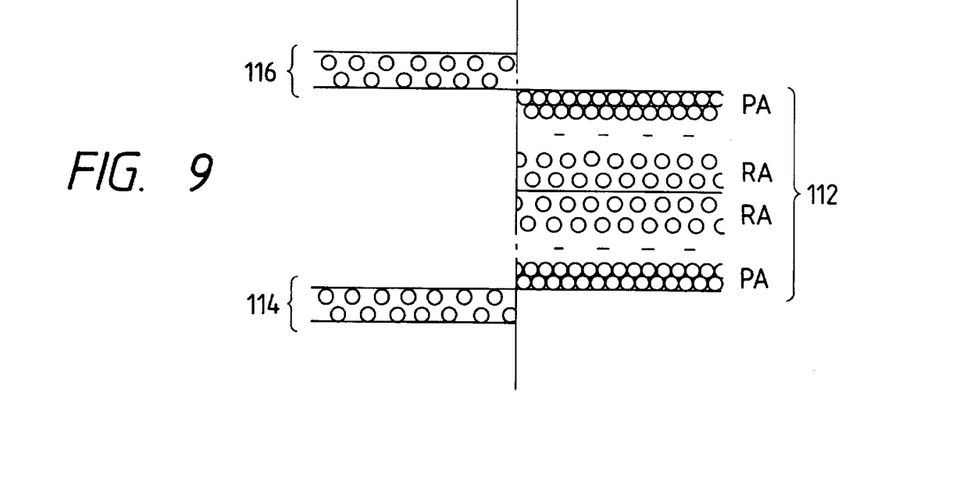
FIG. 9 is an enlarged view of another embodiment of part A in FIG. 3.

In FIG. 9, an enlarged view of part A of another embodiment in FIG. 3, a main layer 112 is made up of two layers with their rich areas RA faced to each other. Also in the embodiment, the resin percentage in each of reinforcement layers 114 and 116 is substantially even and is set to the same resin percentage as the rich area RA of the main layer 112 or more. Therefore, the boundaries with the main layer 112 are also prevented from being lacking in resin, and provide a good contact formation property. The reinforcement layers are thin and the absolute amount of resin is small; the entire tubular substance is not contrary to the lightweight.

If either surface is not formed with a reinforcement layer, the resin percentage is increased on the surface of the main layer. In doing so, the carbon fibers oriented substantially in the length direction are protected from a scratch, providing a highly durable tubular substance.

If the main layer is formed of one layer and inner and outer reinforcement layers have the same degree of resin percentage, the main layer side high in resin percentage is made adjacent to the outer reinforcement layer for helping the action of pushing out surface air by a resin flow caused by pressurization of tightening tape. If the inner and outer reinforcement layers differ in resin percentage, the main layer side high in resin percentage is made adjacent to the reinforcement layer having a small resin percentage for supplying resin to this reinforcement layer.

The reinforced fibers of the reinforcement layer cross the main reinforced fibers (carbon fibers) of the main layer oriented substantially in the length direction and normally are oriented substantially in the circumferential direction, and the fibers cross largely each other on the interface between the reinforcement layer and the main layer, thus voids easily occur at molding. Therefore, preferably the side high in resin percentage is faced to the interface side, preventing delamination or damage from occurring on the interface for achieving the lightweight.

The experiment results for the bend strength of material required particularly for fishing rod pipes and shafts of golf clubs are as follows:

The bend strength of four-point bend of a tubular test substance having inner diameter 10 mm and being 600 mm long (with supporting point spacing 500 mm and load spacing 150 mm) was measured.

A conventional product was made as follows: Overlapped on a main layer prepreg formed by impregnating carbon fibers pulled and aligned in one direction with 25-wt % epoxy resin was a backed reinforcement prepreg formed by impregnating carbon fibers pulled and aligned in the direction perpendicular to the fiber orientation of the main unit prepreg with 40-wt % epoxy resin (thickness of about one fifth of the main layer prepreg), and four turns were made.

As the product of the invention, the main layer prepreg was formed by impregnating carbon fibers with 20-wt % epoxy resin and other points such as backing were as described above.

Although the four test substances of the conventional products and the four test substances of the products of the invention differ slightly in thickness, they are shown by comparing thickness (mm), tare (gw), breaking load (kgw), and specific strength (kgw/gw):

| No. | Thickness | Tare | Breaking load | Specific strength |
|---|---|---|---|---|
| Conventional products | | | | |
| 1 | 0.63 | 20.13 | 73.8 | 3.67 |
| 2 | 0.64 | 20.21 | 75.2 | 3.72 |
| 3 | 0.64 | 20.31 | 70.6 | 3.48 |
| 4 | 0.64 | 20.22 | 71.6 | 3.54 |
| Average value | 0.64 | 20.22 | 72.8 | 3.60 |
| Products of the invention | | | | |
| 1 | 0.58 | 19.04 | 73.5 | 3.86 |
| 2 | 0.59 | 19.08 | 77.0 | 4.04 |
| 3 | 0.59 | 19.24 | 75.8 | 3.94 |
| 4 | 0.59 | 19.12 | 73.5 | 3.85 |
| Average value | 0.59 | 19.12 | 75.0 | 3.92 |

As seen in these experiment results, the products of the invention are improved in specific strength as compared with the conventional products, namely, are lightweight, high in strength, and easy to handle.

The point to note in the manufacturing method of the tubular substance of the invention is that without rapidly rising to a hardening temperature at heating, preferably heat is previously applied at a resin softening temperature lower than the hardening temperature and the whole is made to adapt itself with the temperature held.

Further, since the tubular substance contains a smaller resin amount than the conventional one, preferably a pressurization force higher than that at conventional molding is applied for improving adhesion between fibers.

Since the main layer 112 of the tubular substance 110 of the embodiment in FIG. 3 according to the invention has not necessarily sufficient shock resistance strength, a thermoplastic resin layer having a good vibration absorption property may be formed on the outside of the reinforcement layer 116 of the outermost layer or formed directly on the outside of the main layer 112. As an example of the thermoplastic resin layer, if polyamide fibers are wound on the layer formed by winding prepreg described above and in this state, the above-mentioned heat process for hardening is executed, the polyamide fibers soften and are formed like a layer depending on the temperature. This softening may be incomplete. In doing so, durability increases particularly in shafts of golf clubs, etc.

According to the invention, the resin amount is properly adjusted with respect to the fiber amount, so that prepreg material shear is hard to occur during molding and molding failure can be prevented. Since the prepreg to form the main layer contains different resin impregnation percentages in the thickness direction and at least one layer has a rich resin amount area faced to the wound layer boundary, wound layer boundary coherency becomes good and voids are prevented from occurring on the boundaries for its small average resin amount. Since the absolute amount of resin is small, resin pools are also prevented from occurring. Further, resin percentage is also unevenly distributed in the thickness direction of each layer of the molded tubular substance and the resin amount is increased only on the necessary side, whereby the total resin amount of the tubular substance can be reduced.

Therefore, the lightweight, highly elastic, and highly strong tubular substance can be formed owing to the small resin amount. Particularly, specific strength (strength per unit weight) is improved.

Figure 10:
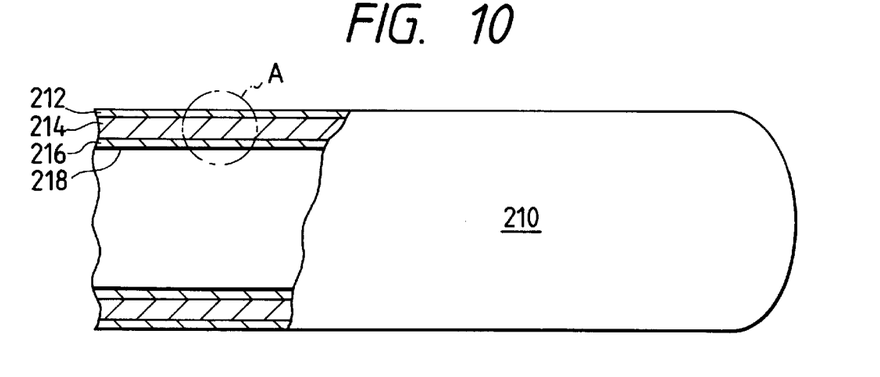
FIG. 10 is a fragmentary longitudinal sectional view of a tubular substance according to the invention.
Figure 11:
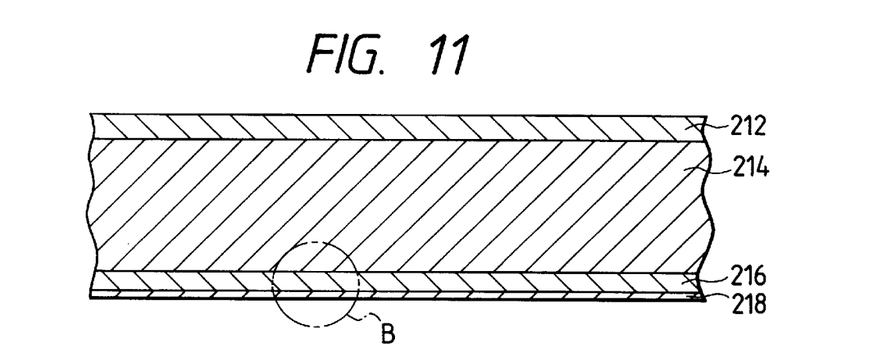
FIG. 11 is an enlarged view of part A in FIG. 10.
Figure 12:
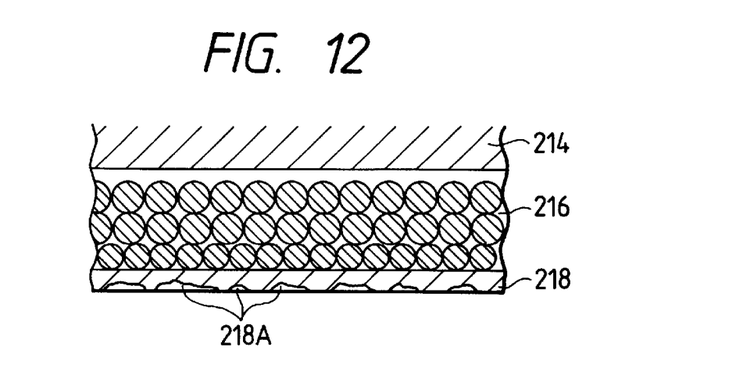
FIG. 12 is an enlarged view of part B in FIG. 11.

FIG. 10 is a partially cutaway view of a tubular substance according to the invention. FIG. 11 is an enlarged view of part A in FIG. 10. FIG. 12 is an enlarged view of part B in FIG. 11. The tubular substance 210 comprises a thin outer reinforcement layer 212 and a thin inner reinforcement layer 216 disposed on the outer surface and inner surface of a thick intermediate layer (main layer) 214 formed of a prepreg provided by impregnating highly strong fibers with synthetic resin. Further, an extra-thin thermosetting synthetic resin coat 218 is formed on the inside of the inner reinforcement layer 216. Most of the highly strong fibers of the intermediate layer 214 are oriented in the length direction and most of the reinforcement layers 212 and 216 are oriented in the circumferential direction.

A manufacturing method of the tubular substance 210 will be discussed with reference to FIGS. 13(a) to 13(d). A mandrel 220 is like a loose taper of about 3/1000 or less or is straight and made of a hard material such as metal. A releasing agent is applied to the surface of the mandrel 220. Fluorine-family resin or silicone-family resin is used as the releasing agent. An extra-thin coat of thermosetting synthetic resin is put on it. In the embodiment, a coat of epoxy resin is applied with a spray 22, FIG. 13(a).

Figure 13A:
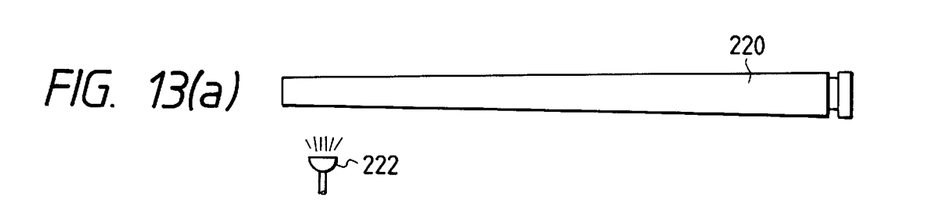
FIGS. 13(a) to 13(d) are illustrations showing a manufacturing method of the tubular substance.

Then, heat is applied for hardening or semi-hardening of the epoxy resin coat.

Figure 13B:
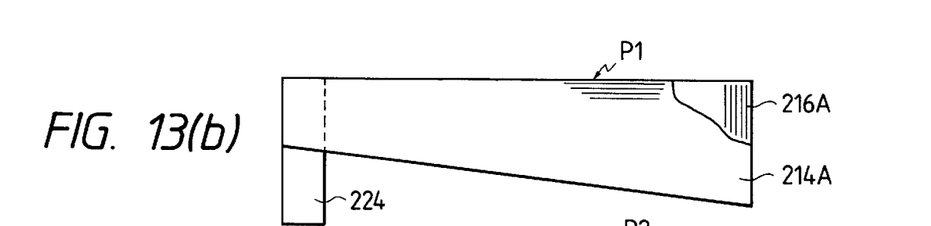

Then, as shown in FIG. 13(b) and later, prepreg is wound for molding the tubular substance. At this time, if the (semi-)hardened epoxy resin coat and the prepreg insufficiently adhere to each other, a coat of viscous epoxy resin is furthermore put on the coat.

The tubular substance is formed of prepregs provided by impregnating highly strong fibers such as carbon fibers, glass fibers, alumina fibers, or aramid fibers with thermosetting synthetic resin such as epoxy resin, phenol resin, or unsaturated polyester resin. In the embodiment, carbon fibers and epoxy resin are used. A pulled and aligned sheet 216A with fibers oriented in the circumferential direction is disposed on the inside of the prepreg P1 and a pulled and aligned sheet 214A with fibers oriented in the length direction is disposed on the outside. A small sheet 224 provided by overlaying a pulled and aligned sheet oriented in the circumferential direction on a scrim sheet is disposed on the inside of the pulled and aligned sheet 216A at the tip of prepreg P1 for reinforcing the end of the tubular substance, FIG. 13(b).

Figure 13C:
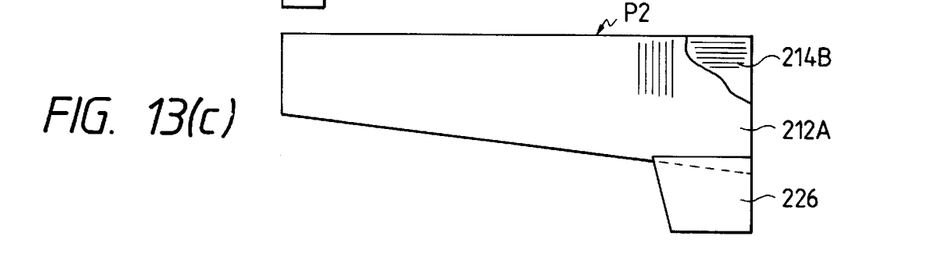

After the prepreg P1 is wound, prepreg P2 is wound; a pulled and aligned sheet 214B oriented in the length direction is disposed on the inside of the prepreg P2 and a pulled and aligned sheet 212A oriented in the circumferential direction is disposed on the outside and further a cloth-like small sheet provided for reinforcing the end of the tubular substance is disposed on the outer margin of the sheet 12A, FIG. 13(c).

Figure 13D:
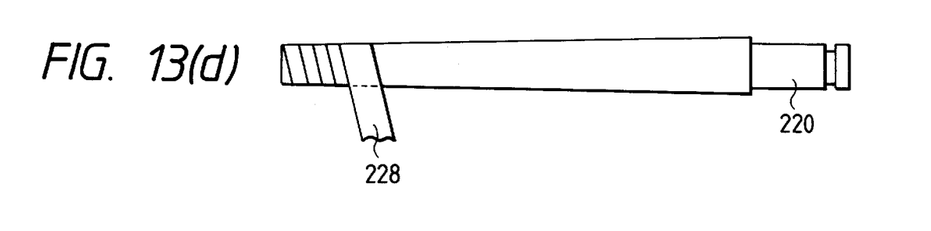

Last, the substance is tightened and pressurized with tightening tape 228, FIG. 13(d), and heated and hardened. An external mold may be used instead of the tightening tape for pressurizing.

After molding, the tightening tape 228 is removed and the mandrel is drawn out. The substance is worked to desired length, dimensions, etc. Further, painting or printing can also be put on the outer peripheral surface for decoration and protection.

The winding steps of the prepregs P1 and P2 are not limited to those in the embodiment and the number of prepreg sheets and fiber orientation combinations are arbitrary.

As shown in FIG. 12, the inside of the tubular substance 210 thus made is formed with the thermosetting synthetic resin coat 218 so as to protect highly strong fibers oriented in the circumferential direction of the inner reinforcement layer 216. As understood from the discussion with reference to FIGS. 13(a) to 13(d), the internal surface of the coat 218 coming in contact with the surface of the mandrel 220 is rubbed with minute asperities on the mandrel surface when the mandrel 220 is drawn out, and minute asperities 218A occur. However, the highly strong fibers of the reinforcement layer 216 are protected by the coat 218 against damage, providing the tubular substance 210 which is highly strong and has excellent durability.

The reinforcement layer 216 is 50 microns or less thick and preferably 30 microns or less thick. The weight percentage of resin is 50% or less and preferably a low resin amount percentage of the same degree as the main layer is set for achieving the lightweight.

The extra-thin coat 218 is made thicker than the asperities on the surface of the mandrel 220 and equal to or thinner than the average diameter of the highly strong fibers of the innermost side of the reinforcement layer 216. Therefore, normally the coat 218 is about 10 microns or less thick, which is as thin as possible within the thickness range in which the highly strong fibers are prevented from being rubbed with the asperities on the mandrel surface when the mandrel 220 is drawn out. Therefore, the weight of the tubular substance 210 little increases and protection of the highly strong fibers can be achieved compatibly with the lightweight. Since the coat 218 is formed of epoxy resin of the same family as the epoxy resin used for the prepreg, it has high coherency and when the mandrel is drawn out or the temperature changes in the operating environment, delamination or strength degradation is hard to occur. When the prepreg uses a polyester family resin, if the coat 218 is also formed of a polyester resin of the same polyester family, high coherency is provided.

The coat 218 in the embodiment is made of epoxy resin, but may be formed of thermoplastic resin as well as such thermosetting synthetic resin as epoxy resin. For example, particles or short fibers may be mixed therein. If particles or short fibers smaller in diameter than the highly strong fibers of the reinforcement layer 216 are used or a material softer than the highly strong fibers is used for the mixed particles or short fibers, when the mandrel is drawn out, the mixed particles or short fibers can prevent the highly strong fibers of the reinforcement layer from being scratched or pressed and bent, etc.

Expandable particles, hollow particles, and other synthetic resin particles can be used as the mixed particles; expandable or hollow particles contribute to achieving the lightweight. Substantially spherical form is preferred from the viewpoint of scratch prevention; if ceramic particles are used, the tubular substance is improved in resistance to abrasion. If talc particles, Teflon particles, or silicon particles are used, slipperiness is improved and when the mandrel is drawn out, drawing-out property is also improved. If flat material is used for the particles, it is pressurized at pressure molding and is aligned so that the wide face is arranged along the length direction, and the coat can be formed thin.

Further, the short fibers may be whiskers, but need not be highly strong fibers. If whiskers are mixed, resistance to abrasion is improved.

The particles or short fibers are mixed 50% or less as volume percentage and normally may be mixed 35% or less. The effect of the reinforcement layer 216 on the highly strong fibers can be lowered by increasing the resin amount.

If the particles or short fibers are thus mixed, when prepreg is heated, a resin flow in the portion corresponding to the coat is suppressed although the portion does not harden; the portion is held like a layer and during the molding, the highly strong fibers of the reinforcement layer 216 can be prevented from coming in contact with the mandrel.

The primary purpose of the extra-thin coat 218 is to prevent damage to the highly strong fibers of the innermost layer of the main portion of the tubular tube, and the coat 218 need not be formed in the wind area of the small sheet 224 or 226 for reinforcement.

As seen from the discussion made so far, according to the tubular substance of the invention, since an extra-thin coat is molded integrally on the inner side of the inner surface of the inner thin reinforcement layer made of prepreg with highly strong fibers oriented substantially in the circumferential direction, the highly strong fibers of the reinforcement layer can be prevented from coming in direct contact with the mandrel. Although the mandrel is drawn out in a direction traversing the highly strong fibers oriented in the circumferential direction of the reinforcement layer, the highly strong fibers are not scratched or cut, thus providing a highly strong tubular substance. If it is used for a long term, scratches of the highly strong fibers are not enlarged, providing excellent durability. Since the coat exists inside the tubular substance, if a foreign member such as a fishing line, a small-diameter tube, or parts strikes the inside, the highly strong fibers can be protected by the coat, thus providing durability. Further, since the coat is extremely thin, the lightweight is not impaired.

In the manufacturing method, the hardened or semi-hardened coat, which is previously formed, exists between the wound prepreg and the mandrel. If the mandrel is drawn out after heating and molding, the coat prevents the highly strong fibers of the prepreg from being damaged owing to minute asperities on the mandrel surface. The above-mentioned tubular substance can be easily manufactured.

Figure 14:
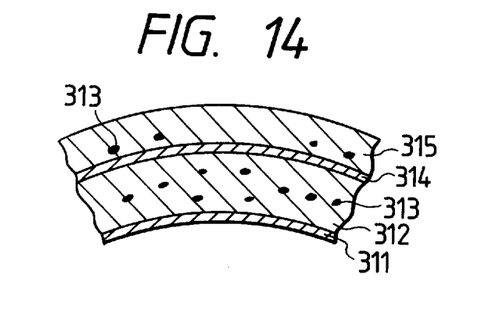
FIG. 14 is a fragmentary sectional view showing another example of a fishing rod of the invention.

FIG. 14 is a fragmentary sectional view showing one example of a fishing rod of the invention made by winding prepreg provided by impregnating reinforced fibers pulled and aligned with resin, wherein numeral 311 is an innermost layer made of a fiber reinforced prepreg with reinforced fibers pulled and aligned in the circumferential direction. Laminated on the innermost layer 311 is a first intermediate layer 312 made of a fiber reinforced prepreg with reinforced fibers pulled and aligned in the axial length direction. Bubbles 313 exist in the first intermediate layer 312. Laminated on the first intermediate layer 312 is a second intermediate layer 314 made of a fiber reinforced prepreg with reinforced fibers pulled and aligned in the circumferential direction. Further, laminated on the second intermediate layer 314 is an outermost layer 315 made of a fiber reinforced prepreg with reinforced fibers pulled and aligned in the axial length direction. The outermost layer 315 and layer interface contain few bubbles 313.

In the structure, a method of adjusting the amount of resin with which the reinforced fibers of the fiber reinforced prepreg of which each layer is made are impregnated is possible as a method of making bubbles 313 exist in the first intermediate layer 312 and few bubbles 313 exist in the outermost layer 315 and layer interface. For example, a method of adjusting a resin impregnation amount when fiber reinforced prepreg is prepared is possible. In this case, preferably the weight percentage of the resin to the total weight of the reinforced fibers and resin in the first intermediate layer 312 is 15%–20% and that in the outermost layer 315 and layer interface is 18%–25%. However, the percentage in the first intermediate layer 312 needs to be set smaller than that in the outermost layer 315.

In the fiber reinforced prepregs, carbon fibers, glass fibers, aramid fibers, etc., can be used as the reinforced fibers, and epoxy resin, phenol resin, polyester resin, etc., can be used as the resin with which the reinforced fibers of the prepregs are impregnated.

Since few bubbles exist in portions where bending stress largest acts and the strength comparatively easily reduces, namely, the outermost layer 315 and the layer interface (particularly, interface between laminated fiber reinforced prepregs different in orientation of the reinforced fibers), the strength can be prevented from reducing on the outermost layer 315 and layer interface and damage to the portions can be prevented. The portion where strength reduction is comparatively hard to occur, namely, the first intermediate layer 312 contains a small resin impregnation amount to such a degree that bubbles 313 partially exist, and is very lightweight. Therefore, the fishing rod is not broken under a large load; it is highly strong and moreover lightweight.

Figure 15:
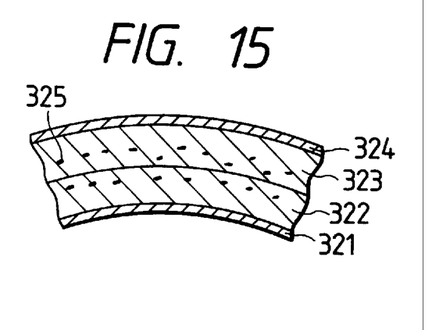
FIG. 15 is a fragmentary sectional view showing another example of a fishing rod of the invention.

The fishing rod of the invention can adopt a structure as shown in FIG. 15. That is, first and second intermediate layers 322 and 323 made of fiber reinforced prepreg with the reinforced fibers pulled and aligned in the axial length direction are laminated on an innermost layer 321 made of fiber reinforced prepreg with the reinforced fibers pulled and aligned in the circumferential direction, and an outermost layer 324 made of fiber reinforced prepreg with the reinforced fibers pulled and aligned in the circumferential direction is laminated on the second intermediate layer 323.

Bubbles 325 exist in the first and second intermediate layers 322 and 323; they exist a comparatively great deal at the center of the region extending across the first and second intermediate layers 322 and 323. To make the bubbles 325 exist a comparatively great deal at the center of the region extending across the first and second intermediate layers 322 and 323, the resin impregnation amount is adjusted when fiber reinforced prepreg is prepared, as described above. The bubbles 325 are thus made to exist a comparatively great deal at the center of the region extending across the two layers (portion hard to be affected by bending stress), whereby the fishing rod can be made more lightweight while strength reduction is suppressed.

Also in such a structure, bubbles 325 scarcely exist in portions where bending stress largest acts and the strength comparatively easily reduces, namely, the outermost layer 324 and the layer interface, thus the strength can be prevented from reducing on the outermost layer 324 and layer interface and damage to the portions can be prevented. The portions where strength reduction is comparatively hard to occur, namely, the first and second intermediate layers 322 and 323 contain a small resin impregnation amount and bubbles 325, thus are very lightweight. Therefore, the fishing rod is not broken under a large load; it is also highly strong and moreover lightweight.

FIGS. 14 and 15 show the cross sections in the circumferential direction; similar structures to those in FIGS. 14 and 15 are also taken in the cross sections in the axial length direction. Each of the structures may be adopted for the whole or a part of a fishing rod.

Figure 16:
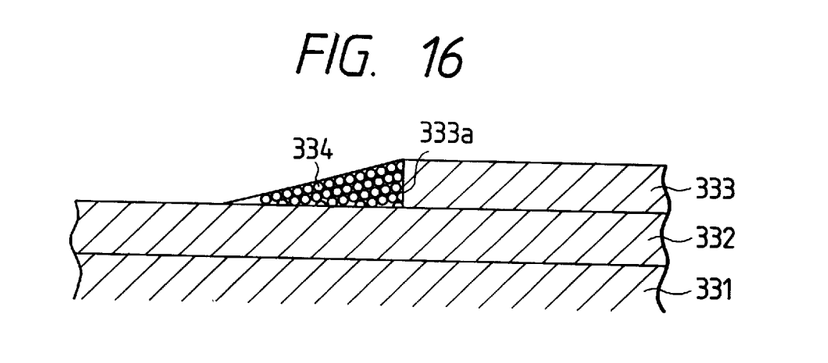
FIG. 16 is a sectional view showing a structure in the vicinity of the end in an outermost layer of the fishing rod of the invention.

FIG. 16 is a sectional view showing a structure in the vicinity of the end in an outermost layer of the fishing rod of the invention. In the structure in the vicinity of the end, an outermost layer 332 is laminated on a main layer 331 made of a fiber reinforced prepreg and a reinforcement lug 333 exists on the outermost layer 332. An end 333a of the reinforcement lug 333 is formed with a fiber reinforcement part 334 as a thickness adjustment part.

The fiber reinforcement part 334 has a cross section formed like a moderate slope or curved face for absorbing the level difference caused by the thickness of the reinforcement lug 333. The fiber reinforcement part 334 may be formed by winding a different fiber reinforced prepreg from the fiber reinforced prepreg of which the main layer 331 (containing the outermost layer 332) is made; some of the reinforced fibers of the fiber reinforced prepreg of which the main layer 331 or the reinforcement lug 333 is made may be used.

Since stress concentrating on the end 333a is spread by means of the fiber reinforcement part 334 thus formed if a large load is applied, delamination, a crack, or the like can be prevented from occurring on the end 333a.

Figure 17:
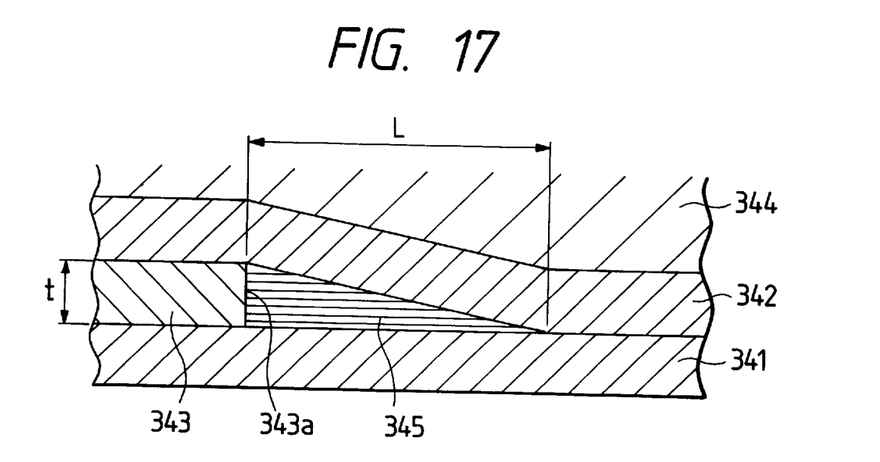
FIG. 17 is a sectional view showing a structure in the vicinity of the end in an intermediate layer of the fishing rod of the invention.

FIG. 17 is a sectional view showing a structure in the vicinity of the end in an intermediate layer of the fishing rod of the invention. In the structure in the vicinity of the end, an intermediate layer 342 is laminated on an innermost layer 341 made of a fiber reinforced prepreg, a reinforcement lug 343 exists between the intermediate layer 342 and the innermost layer 341, and further a main layer 344 is laminated on the intermediate layer 342. An end 343a of the reinforcement lug 343 is formed with a resin pool 345 as a thickness adjustment part. The intermediate layer 342 and the innermost layer 341 are made of fiber reinforced prepreg with reinforced fibers pulled and aligned in the axial length direction.

The resin pool 345 can be formed, for example, by a method of coating with resin of the same kind as the resin of the fiber reinforced prepreg or winding a film of the resin before the intermediate layer 342 is wound or a method of increasing the resin impregnation amount of the fiber reinforced prepreg of which the reinforcement lug 343 is made (for example, 40 wt % or more) or increasing about 20 wt % greater than the resin impregnation amount of the fiber reinforced prepreg of which the main layer 344 is made and using the resin. Preferably, the length L of the resin pool 345 is three times or more the thickness t of the reinforcement lug 343. In setting so, the fibers pulled and aligned in one direction can be prevented from being bent or meandering.

The resin pool 345 thus formed can prevent the reinforced fibers of the intermediate layer 342 from being abutted directly against the end 343a and broken with the end 343a as a supporting point.

Next, evaluation for clarifying the effect of the fishing rod of the invention will be discussed. Specifically, a 4-point bending test was executed for the fishing rod material of the invention having the structure shown in FIG. 14 and as a control example, a fishing rod material using a laminated substance with the weight percentage of resin to the total weight of reinforced fibers and the resin being 10%–20%. As a result, the specific strength and the specific elasticity of the fishing rod material of the invention were larger than those of the fishing rod material of the control example. Delamination from the end of the outermost layer and damage from the end of the intermediate layer were not confirmed for the fishing rod material of the invention. On the other hand, delamination from the end of the outermost layer and damage from the end of the intermediate layer were partially confirmed for the fishing rod material of the comparison example.

The invention is not limited to the embodiments, and the number of turns of fiber reinforced prepreg, the thickness of each layer, and the resin impregnation amount are adjusted appropriately in response to applications and specifications. However, the resin impregnation amount needs to be made 25 wt % or less in the fiber reinforced prepreg with the reinforced fibers pulled and aligned in the axial length direction. If the outermost layer of the rod pipe or the end of the intermediate layer is formed with a thickness adjustment part, bubbles need not exist in a plurality of layers or layer interface.

As we have discussed, the fishing rod of the invention is made of a rod pipe comprising a plurality of layers formed by winding fiber reinforced prepreg provided by impregnating reinforced fibers with resin. The inner layer of the layers has bubbles and the bubbles existing in the outermost layer and/or layer interface are fewer than the bubbles existing in the inner layer. Therefore, the portions where strength reduction easily occurs are reinforced and the fishing rod has excellent specific strength and specific elasticity although it contains a small resin impregnation amount of fiber reinforced prepreg.

In the fishing rod of the invention, the end of the fiber reinforced prepreg on the outermost layer or intermediate layer of the rod pipe is formed with a thickness adjustment part for absorbing the level difference caused by the thickness difference, whereby the strength of the fishing rod can be furthermore improved.

What is claimed is:

1. A fishing rod comprising:
   a main layer formed by winding a first prepreg provided by impregnating highly strong fibers with resin so that weight percentage of the resin becomes 25% or less so that the fibers are oriented in an axial length direction; and
   a reinforcement layer formed by winding a second prepreg provided by impregnating highly strong fibers with resin so that the fibers are oriented in a direction crossing the fiber orientation of said main layer on at least one of an inside and an outside of said main layer, wherein
   said reinforcement layer is formed thinner than said main layer, and
   resin impregnation percentage of said second prepreg is set to substantially the same as that of said first prepreg.

2. A fishing rod according to claim 1, wherein said first prepreg has a poor resin amount area and a rich resin amount area in a thickness direction and contains an average impregnation amount of the resin approximately in the range of 10 wt % to 20 wt %.

3. A fishing rod according to claim 2, wherein said first prepreg is wound so that said rich resin amount area is located in at least one of adjacent layers at a wound boundary.

4. A fishing rod according to claim 1, further comprising:
   an extra-thin coat consisting essentially of thermosetting or thermoplastic synthetic resin, and molded integrally on an inner circumferential surface of said reinforcement layer formed on the inside of the main layer.

5. A fishing rod made of a rod pipe comprising a plurality of layers formed by winding fiber reinforced prepreg provided by impregnating reinforced fibers pulled and aligned in a specific direction with resin so that said reinforced fibers are oriented in an axial direction, wherein an inner layer of said plurality of layers has bubbles and wherein bubbles existing in at least one of an outermost layer and a layer interface are fewer than the bubbles existing in said inner layer.

6. A fishing rod according to claim 5, wherein at least one layer comprises a fiber reinforced prepreg with reinforced fibers pulled and aligned in a circumferential direction, and at least one layer comprises a fiber reinforced prepreg with reinforced fibers pulled and aligned in the axial length direction.

7. A fishing rod according to claim 6, wherein an innermost layer is made of a fiber reinforced prepreg with reinforced fibers pulled and aligned in the circumferential direction.

8. A fishing rod according to claim 7, wherein a first intermediate layer made of a fiber reinforced prepreg with reinforced fibers pulled and aligned in the axial length direction is laminated on the innermost layer.

9. A fishing rod according to claim 8, wherein bubbles exist in the first intermediate layer.

10. A fishing rod according to claim 8, wherein a second intermediate layer made of a fiber reinforced prepreg with reinforced fibers pulled and aligned in the circumferential direction is laminated on the first intermediate layer.

11. A fishing rod according to claim 10, wherein the outermost layer is made of a fiber reinforced prepreg with reinforced fibers pulled and aligned in the axial length direction, said outermost layer being laminated on the second intermediate layer.

12. A fishing rod according to claim 8, wherein the weight percentage of resin to the total weight of the reinforced fibers and resin in the first intermediate layer is in the range of about 15%–20%.

13. A fishing rod according to claim 6, wherein the weight percentage of resin to the total weight of the reinforced fibers and resin in the outermost layer is in the range of about 18%–25%.

14. A fishing rod according to claim 6, wherein the weight percentage of resin to the total weight of the reinforced fibers and resin in the layer interface is in the range of about 18%–25%.

15. A fishing rod according to claim 8, wherein a first weight percentage of resin to the total weight of the reinforced fibers and resin in the first intermediate layer is in the range of about 15%–20%, and a second weight percentage of resin to the total weight of the reinforced fibers and resin in the outermost layer is in the range of about 18%–25%, and wherein said first weight percentage is smaller than said second weight percentage.

16. A fishing rod according to claim 7, wherein first and second intermediate layers made of a fiber reinforced prepreg with reinforced fibers pulled and aligned in the axial length direction are respectively laminated on the innermost layer.

17. A fishing rod according to claim 16, wherein the outermost layer is made of a fiber reinforced prepreg with reinforced fibers pulled and aligned in the circumferential direction, said outermost layer being laminated on the second intermediate layer.

18. A fishing rod according to claim 16, wherein bubbles exist in said first and second intermediate layers.

19. A fishing rod according to claim 18, wherein said bubbles are concentrated at an interface of said first and second intermediate layers.

20. A fishing rod according to claim 19, wherein said first and second intermediate layers combine to define a thickness, said interface being disposed substantially at a midpoint of said thickness.

* * * * *